(12) United States Patent
Ross-Trevor

(10) Patent No.: US 11,241,108 B2
(45) Date of Patent: Feb. 8, 2022

(54) MODULAR PHOTOGRAPH DISPLAY SYSTEM

(71) Applicant: LITE-A-FOTO LLC, Maplewood, NJ (US)

(72) Inventor: Stacey Ross-Trevor, Maplewood, NJ (US)

(73) Assignee: LITE-A-FOTO LLC, Maplewood, NJ (US)

( * ) Notice: Subject to any disclaimer, the term of this patent is extended or adjusted under 35 U.S.C. 154(b) by 69 days.

(21) Appl. No.: 16/869,453

(22) Filed: May 7, 2020

(65) Prior Publication Data

US 2020/0352363 A1 Nov. 12, 2020

Related U.S. Application Data

(60) Provisional application No. 62/844,992, filed on May 8, 2019.

(51) Int. Cl.
*A47G 1/06* (2006.01)
*G02F 1/13357* (2006.01)
*G02F 1/1335* (2006.01)

(52) U.S. Cl.
CPC ..... *A47G 1/0622* (2013.01); *G02F 1/133603* (2013.01); *G02F 1/133608* (2013.01);
(Continued)

(58) Field of Classification Search
CPC .......... A47G 1/0622; A47G 2001/0672; A47G 2001/0677; A47G 2001/148; A47G 2200/106; A47G 1/065; A47G 2001/147; A47G 1/14; G02F 1/133608; G02F 1/133603; G02F 1/133612; G09G 3/32; G09G 3/34; H01L 2251/5361; G09F 2007/1891; G09F 2007/1843;
(Continued)

(56) References Cited

U.S. PATENT DOCUMENTS

| | | |
|---|---|---|
| 4,942,685 A | 7/1990 | Lin |
| 6,920,711 B2 | 7/2005 | Miller et al. |
| 2004/0181989 A1 | 9/2004 | Miller |

OTHER PUBLICATIONS

Nova Display Systems, Inc., "Custom Size LED Displays—LED Light Pockets", printout of webpage:<https://www.novadisplay.com/display-solutions-ideas/illuminated-displays/custom-size-led-light-pockets/>, retrieved May 18, 2020 (2 pages).
(Continued)

*Primary Examiner* — Cassandra Davis
(74) *Attorney, Agent, or Firm* — McCarter & English, LLP

(57) ABSTRACT

A modular photograph display system is provided. The display system can include one of more modular illuminated photograph display assemblies including a frame, base, and a post therebetween. The frame can include a frame back, illumination panel, photograph matte, window, clip assemblies, and cover. The clip assemblies can secure the window and matte against the frame back, such that a photograph can be inserted therebetween, and can magnetically secure the cover to the frame back. The base can include an LED driver and a controller for controlling one or more illumination panels. The bases of two or more modular photograph display assemblies can be coupled together to form an assembly of display assemblies. Additional frames and posts can added on top of the frames of the modular display assemblies to further increase the number of photographs that can be displayed.

20 Claims, 13 Drawing Sheets

(52) U.S. Cl.
CPC ............... *A47G 2001/0672* (2013.01); *A47G 2001/0677* (2013.01); *G02F 1/133612* (2021.01)

(58) Field of Classification Search
CPC .... G09F 13/005; G09F 9/3026; G06F 1/1601; Y10T 24/32; F21V 23/001; F21V 23/002; F21W 2131/30; F21W 2131/304; F21S 2/00
See application file for complete search history.

(56) References Cited

OTHER PUBLICATIONS

Nova Display Systems, Inc., "Modular Display Stands", printout of webpage:<https://www.novadisplay.com/display-solutions-ideas/display-stands-exhibits/modular-display-stands/>, retrieved May 18, 2020 (3 pages).

Xcel Products, Inc., "Custom Fixtures & Display Systems", printout of webpage:<https://xcelproducts.com/products/type/display-systems-fixtures/>, retrieved May 18, 2020 (9 pages).

MODULAR PHOTOGRAPH DISPLAY SYSTEM

CROSS-REFERENCE TO RELATED APPLICATION

This application claims priority to U.S. Provisional Patent Application No. 62/844,992, filed on May 8, 2019, the entire contents of which are hereby expressly incorporated by reference.

FIELD OF THE DISCLOSURE

The present disclosure relates generally to a modular photograph display system. More specifically, the present disclosure relates to an illuminated modular photograph display system that can be reconfigured, expanded, and combined with one or more additional display systems.

RELATED ART

Various powered backlit picture frames for displaying media such as photos, lithographs, artworks such as paintings, and drawings are currently available. For example, U.S. Pat. No. 4,942,685 discloses a photo frame with a hidden light illumination loop made of light transmitting material, a DC- or AC-operated light source that can provide necessary light delivered by the light illumination loop all around the frame and cast on the photo located within the frame.

U.S. Pat. No. 6,920,711 discloses a photo display system having a decorative frame, an imaged transparency disposed on the decorative frame and a diffuser film disposed on the imaged transparency. The photo display system also has a base having a means for mounting the decorative frame and a means for attaching a diffuse reflector.

U.S. Patent Publication No. 2004/0181989 discloses a photo display system that can quickly and easily be converted from an ambient light backlit viewing mode to a powered backlit viewing mode. The photo display system includes an imaged transparency, a diffuser film disposed next to the imaged transparency and a diffuse reflector.

However, what would be desirable, but has not yet been developed, is a modular illuminated photograph display system that can be easily reconfigured and expanded in order to display a wide array of photographs, in many different combinations and spatial arrangements.

SUMMARY

The present disclosure relates to a modular photograph display system comprising one or more modular photograph display assemblies each including a frame, a base, and a hollow post positioned therebetween. The frame can include a frame back panel with sidewalls having one or more apertures therein, an illumination panel secured to the frame back panel, a window, one or more clip assemblies, and a cover. The one or more clip assemblies can retain the window against the illumination panel such that a first photograph can be secured therebetween and can be illuminated by the illumination panel, and can magnetically secure the cover to the frame back panel. The base can include a top panel, a base plate, and sidewalls enclosing a driver and associated controller circuitry for providing power to, and controlling, the illumination panel. The hollow post can be coupled to the frame about an aperture in a sidewall thereof and can be coupled to the top panel of the base about an aperture therein. A power conductor can be electrically coupled between the illumination panel and the driver, extending through the frame back, the hollow post, and the top panel of the base.

The bases of two or more modular photograph display assemblies can be coupled together to form an array of display assemblies. Additional frames and posts can also be added on to the frames of the modular display assemblies to display additional photographs, in any desired spatial configuration.

BRIEF DESCRIPTION OF THE DRAWINGS

The foregoing features of the disclosure will be apparent from the following Detailed Description, taken in connection with the accompanying drawings, in which.

DETAILED DESCRIPTION

The present disclosure relates to a modular photograph display system comprising one or more modular illuminated photograph display assemblies, as described in detail below in connection with FIGS. 1-13.

Figure 1:
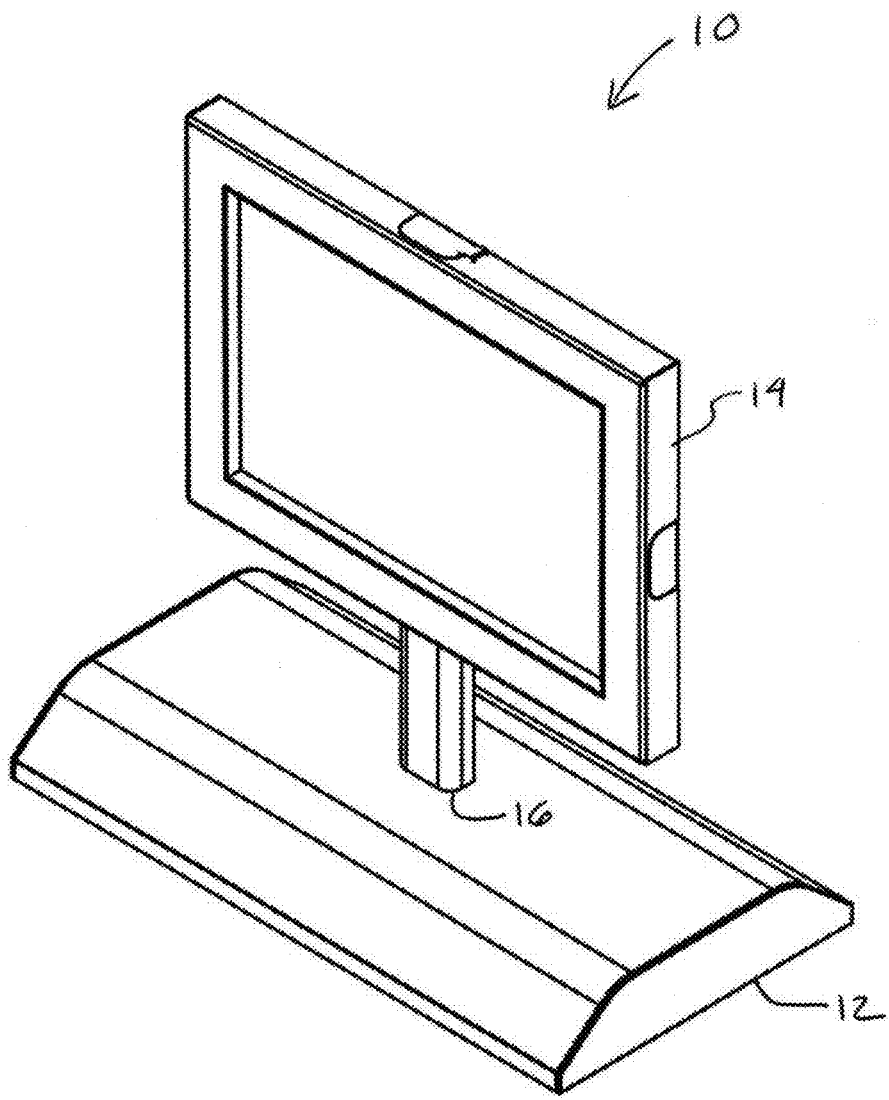
FIG. 1 is a perspective view of a modular photograph display assembly of the present disclosure, including a frame, a post, and a base.

FIG. 1 is a perspective view of a modular photograph display assembly in accordance with the present disclosure, indicated generally at 10. The modular photograph display assembly 10 can include a base 12, frame 14, and a hollow post 16 coupling the frame 14 to the base 12 and providing an electrical connection therebetween.

Figure 2:
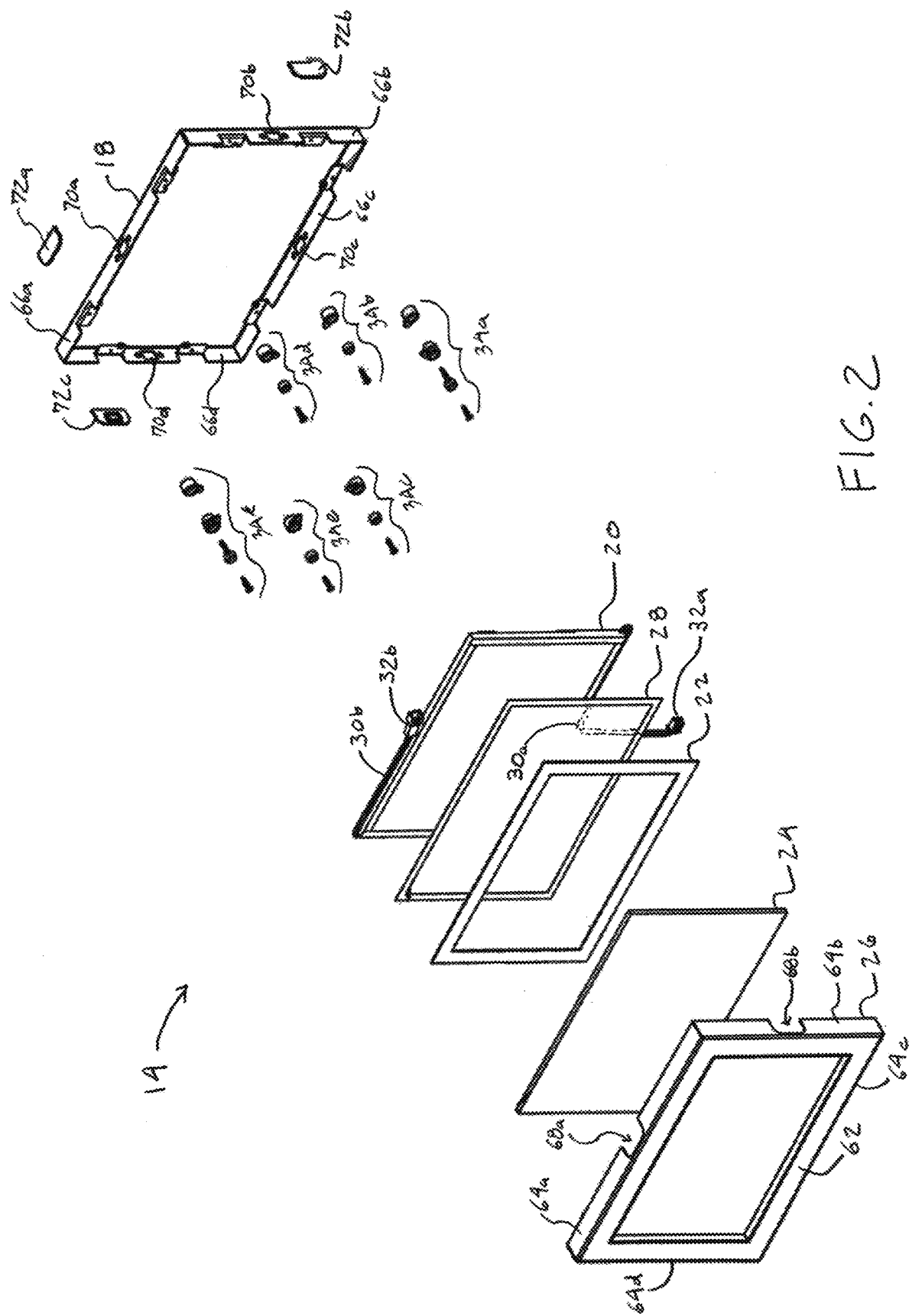
FIG. 2 is an exploded view illustrating components of the frame of the modular photograph display assembly of FIG. 1.

FIG. 2 is an exploded view of the frame 14 of the modular photograph display assembly of 10, illustrating components thereof. Specifically, the frame 14 can include a frame back panel 18, an illumination panel 20, a photograph matte 22, a window 24, and a frame cover 26. A photograph 28 can be positioned between the illumination panel 20 and the matte 22. The illumination panel 20 can be edge-lit or back-lit, and can be secured to the frame back panel 18 with double-sided foam tape, adhesive, or any other suitable securing mechanism. The illumination panel 20 can include a first power conductor 30a for providing power thereto and a second power conductor 30b for providing power to another illumination panel. For example, the first power conductor 30a can include a male connector 32a and the second power conductor 30b can include a female connector 32b, such that one or more illumination panels 20 can be daisy-chained together and powered from a single driver (see, e.g., light-emitting diode (LED) driver 80 shown in FIG. 4). Additionally, the illumination panel 20 can be configured to emit light at a plurality of different temperatures and/or colors. For example, the illumination panel can output white light at color temperatures of 3900-4500K, white light at color temperatures of 5000-5500K, white light at other temperatures, combinations of red-green-blue (RGB) light throughout the color spectrum, or combinations thereof. It is noted that the illumination panel 20 can be illuminated using any source of illumination suitable for backlighting purposes, including, without limitation, LEDs, incandescent illumination (e.g., one or more incandescent bulbs), fluorescent illumination, electroluminescent (EL) illumination, organic light-emitting diode (OLED) illumination, or any other suitable source of illumination.

The photograph 28 can be printed on backlight photo paper, such as KODAK brand Universal Backlit Film, or other photograph media suitable for backlighting. As shown in FIG. 2, the photograph 28 can be sandwiched between the illumination panel 20 and the matte 22. The matte 22 can be sized and shaped to form a border around the photograph 28 and can have a thickness (e.g., 0.031 in) sufficient to prevent the window 24 from directly contacting a printed image on the photograph 28. The matte 22 can be formed from paper card stock, polyvinyl chloride (PVC) plastic, or other suitable materials. The window 24 can be formed from glass, acrylic, or other suitable light-transmissive materials. For example, the window 24 can be formed from ACRYLITE brand P99 non-glare acrylic material or any suitable equivalent. Accordingly, the photograph 28 can be illuminated by the illumination panel 20, positioned adjacent thereto, and viewed by an observer through the window 24.

One or more clip assemblies 34a-f (together, clip assemblies 34) can secure the photograph 28, the matte 22, and the window 24 against the frame back panel 18. For example, as shown in FIG. 2, the clip assemblies 34 can be attached to the periphery of the frame back panel 18 and can engage a front face of the window 24, thereby holding the matte 22 and photograph against the illumination panel 20. A rear side of frame back panel 18 can also be provided with brackets, or other mechanisms, for securing (e.g., mounting) the display assembly 10 to a wall or other surface.

Figure 3:
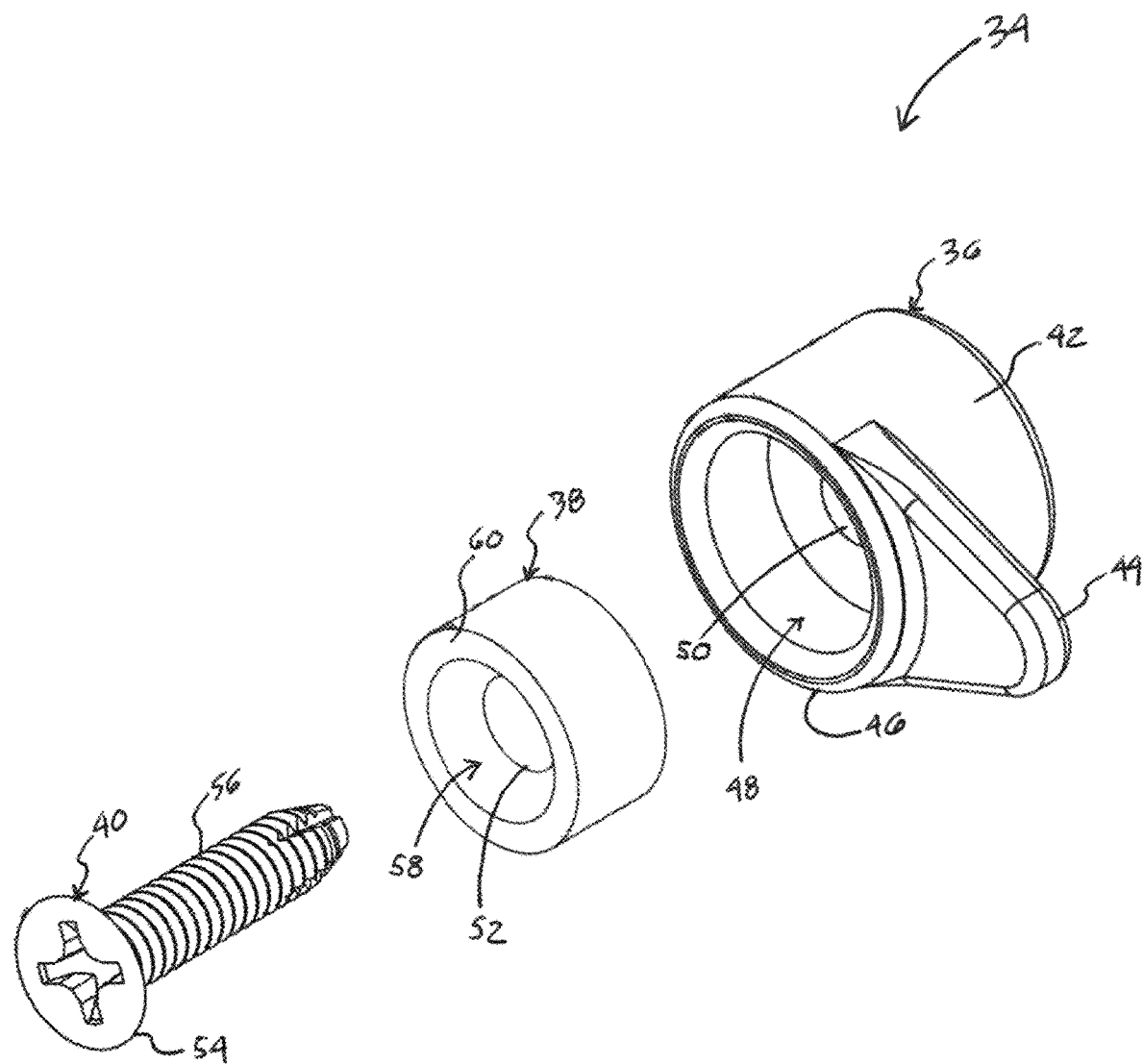
FIG. 3 is an exploded view illustrating components of a clip assembly of the modular photograph display assembly of the present disclosure.

FIG. 3 is an exploded view of a clip assembly 34 of the modular photograph display assembly 10 of the present disclosure, illustrating components thereof in greater detail. Each clip assembly 34 can include a clip 36, a magnet 38, and a fastener 40. As shown, the clip 36 can include a generally cylindrical body 42 with a finger 44 extending from an upper edge 46 thereof. The body 42 can include a recess 48 and an aperture 50 can extend through the body 42 along its rotational axis. The clip can be formed from nylon, plastic, or other suitable materials. The magnet 38 can be generally cylindrical, can be sized to be received within the recess 48 of the clip 36, can have a height that is greater than the depth of the recess 48, and can have an aperture 52 extending through its rotational axis. The magnet can be formed from NdFeB, grade N42 material, or any other suitable material. The fastener 40 can include a head 54 and a shank 56 that is sized to extend through the aperture 50 of the clip 36 and the aperture 52 of the magnet 38 and secure the clip assembly 34 to the frame back 18. The fastener 40 can be a screw, as shown in FIG. 3, bolt, pin, rivet, or other suitable fastener.

The magnet 38 can also include a recess 58 (e.g., countersink or counterbore) sized to accept the head 54 of the fastener 40, such that the head 54 does not extend beyond a top face 60 of the magnet when the clip assembly is installed on the frame back 18. When the frame 14 is assembled, the finger 44 of the clip assembly 34 can be rotated towards the center of the frame 14, thereby engaging the window 24 and securing the picture 28, matte 22, and window 24 therein. Conversely, the finger 44 of the clip assembly 34 can be rotated away from the center of the frame 14, thereby releasing the window 24, the matte 22, and picture 28. Accordingly, a user can easily remove or replace the photograph 28 by rotating the clip assemblies 34.

Returning to FIG. 2, the frame 14 can include a cover 26 having a front face 62 and sidewalls 64a-d that depend from the front face 62 and extend over sidewalls 66a-d of the frame back 18 when the frame 14 is assembled. The sidewalls 64a-d of the cover 26 can include one or more cutouts 68a and 68b (68c and 68d not shown) that are positioned to correspond with apertures 70a-d in the sidewalls 66a-d of the frame back 18. The cutouts 68a and 68b can also correspond in shape with the cross-section of the post 16, which can be coupled to the frame back 18 at the locations of the apertures 70a-d. Accordingly, the frame 14 can be selectively mounted with respect to the base 12 in one or more orientations (e.g., horizontal or vertical), based on the location at which the post 16 is attached to the frame back 18. For example, with respect to FIG. 2, if the post 16 is attached to the frame back 18 at the location of aperture 70c, the frame 14 can be mounted in a horizontal orientation with respect to the base 12. Conversely, if the post 16 is attached to the frame back 18 at the location of aperture 70b, the frame 14 can be mounted in a vertical orientation with respect to the base 12. As will be understood by those of ordinary skill in the art, the power conductor 30a of the illumination panel 20 can be routed through the post 16 and corresponding aperture, and into the base 12 of the modular photograph display assembly for connection to a power supply (see, e.g., LED driver 80 shown in FIG. 4). One or more hole covers 72a-c can also be provided. As shown in FIG. 2, the hole covers 72a-c can be sized and shaped to be received within one or more of the cutouts 68a-d in the cover 26 and can be configured to engage the frame back 18 of the frame 26, thereby occluding one or more of the apertures 70a-d from view and providing an aesthetically pleasing exterior appearance of the frame 14. For example, with respect to FIG. 2, if the post 16 is attached to the frame back 18 at the location of aperture 70c, hole covers 72a-c can be attached to the frame back 18 at apertures 70a, 70b, and 70d respectively. The hole covers 72a-c can be attached to the frame back 18 or the cover 26 by snap-fit engagement, magnets, clips or other mechanisms known to those of ordinary skill in the art.

As discussed in connection with FIG. 3, the magnet top face 60 can extend beyond the clip edge 46 and the head 54 of the fastener 40 when the clip assembly 34 is assembled and attached to the frame back 18. Additionally, the clip assemblies 34, the frame back 18, and the cover 26 can be configured such that the magnet top face 60 contacts the cover 26 when the cover 26 is positioned over the frame back, as shown in FIG. 1. Moreover, the cover 26 can be formed from galvanized steel, or other suitable magnetic materials. Accordingly, when the frame 14 is fully assembled, the top face 60 of the magnet 38 can contact the cover 26, thereby magnetically securing the cover 26 to the frame back 18. As such, a user can easily access the photograph 28 by magnetically disengaging the cover 26 from the frame back 18 (e.g., by pulling the cover 26 away therefrom), rotating the clip assemblies 34, and removing the window 24 and matte 22. Of course, the photograph 28 can be replaced or repositioned and the frame 14 reassembled by reversing the foregoing steps.

Figure 4:
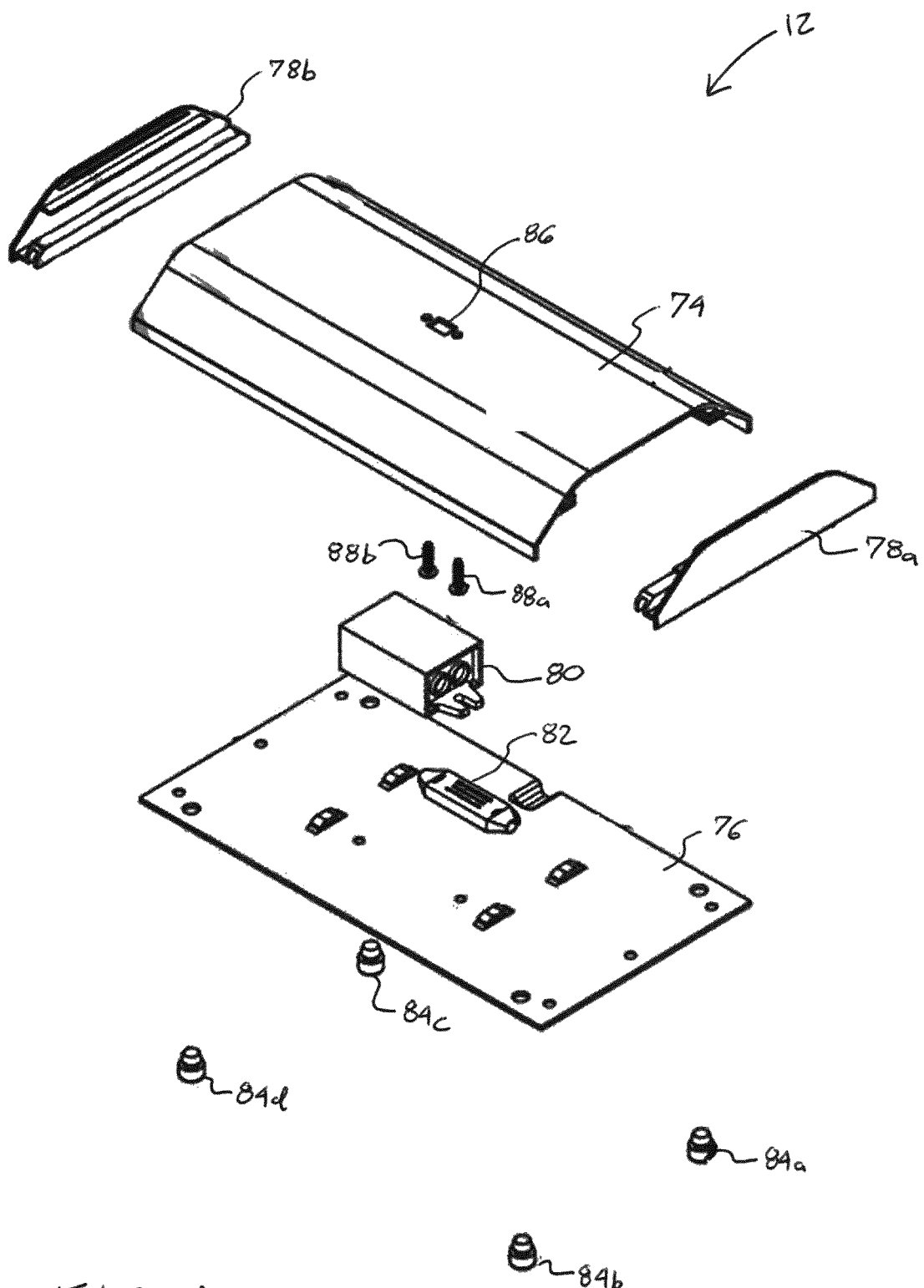
FIG. 4 is an exploded view illustrating components of the base of the modular photograph display assembly of FIG. 1.

FIG. 4 is an exploded view illustrating components of the base 12 of the modular photograph display assembly 10 of the present disclosure. The base 12 can include a top panel 74 having an aperture 86, a base plate 76, and sidewalls 78a and 78b forming an enclosure containing electrical components for providing power to, and for controlling, the illumination panel 20. One or more feet 84a-d can be provided on an underside of the base plate 76. One or more fasteners 88a and 88b can be provide and configured to attach the post 16 to the base 12 about the aperture 86 in the top panel 74. The base 12 can enclose an LED driver 80 for providing power to the illumination panel 20 and a controller 82 for modulating the output (e.g., intensity, temperature, color, etc.) of the illumination panel 20. According to one example, the controller 82 can be electrically coupled to the output of the LED driver 80 and the controller 82 can be electrically coupled to the illumination panel 20 by way of power conductor 30a. As will be understood by those of ordinary skill in the art, the power conductor 30a can be sized to extend from the illumination panel 20, through one of the aperture 70-d in the frame back 18, through the hollow post 16, through the aperture 86 in the top panel 74, and into the base 12 for connection to the controller 82 and/or LED driver 80.

Figure 5:
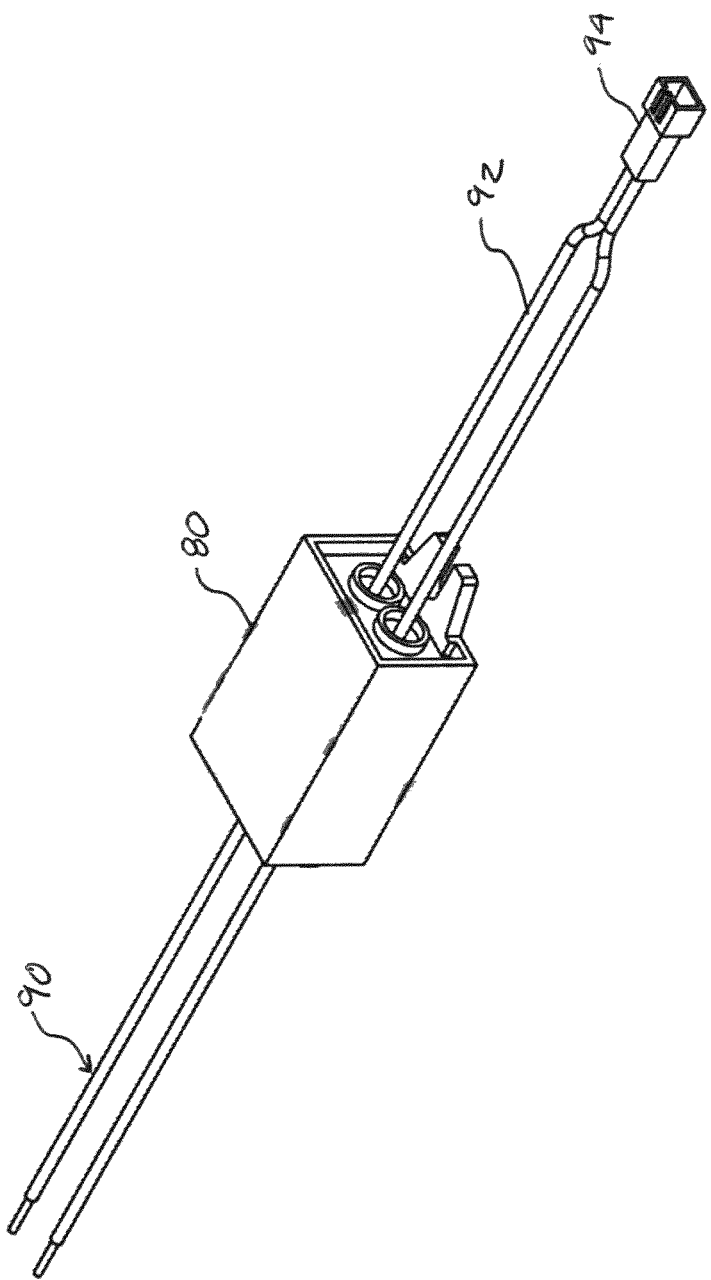
FIG. 5 is a perspective view of an LED driver assembly of the modular photograph display assembly of the present disclosure.

FIG. 5 is a perspective view of the LED driver 80 of the modular photograph display assembly 10, illustrating connections thereto. The LED driver 80 can include an input power conductor 90 and an output power conductor 92. The input power conductor 90 can provide power to the LED driver 80 from a power supply (e.g., wall outlet) and can include a switch (e.g., rocker switch or the like) for interrupting power to the LED driver 80 and displaying the photographs without backlit illumination. The output power conductor 92 can include a connector 94 for removably coupling the LED driver 80 to another component. For example, the connector 94 can be a male-type connector and can be coupled to a power conductor extending from the controller 82 having a female-type power connector (see FIG. 6), or vice versa.

Figure 6:
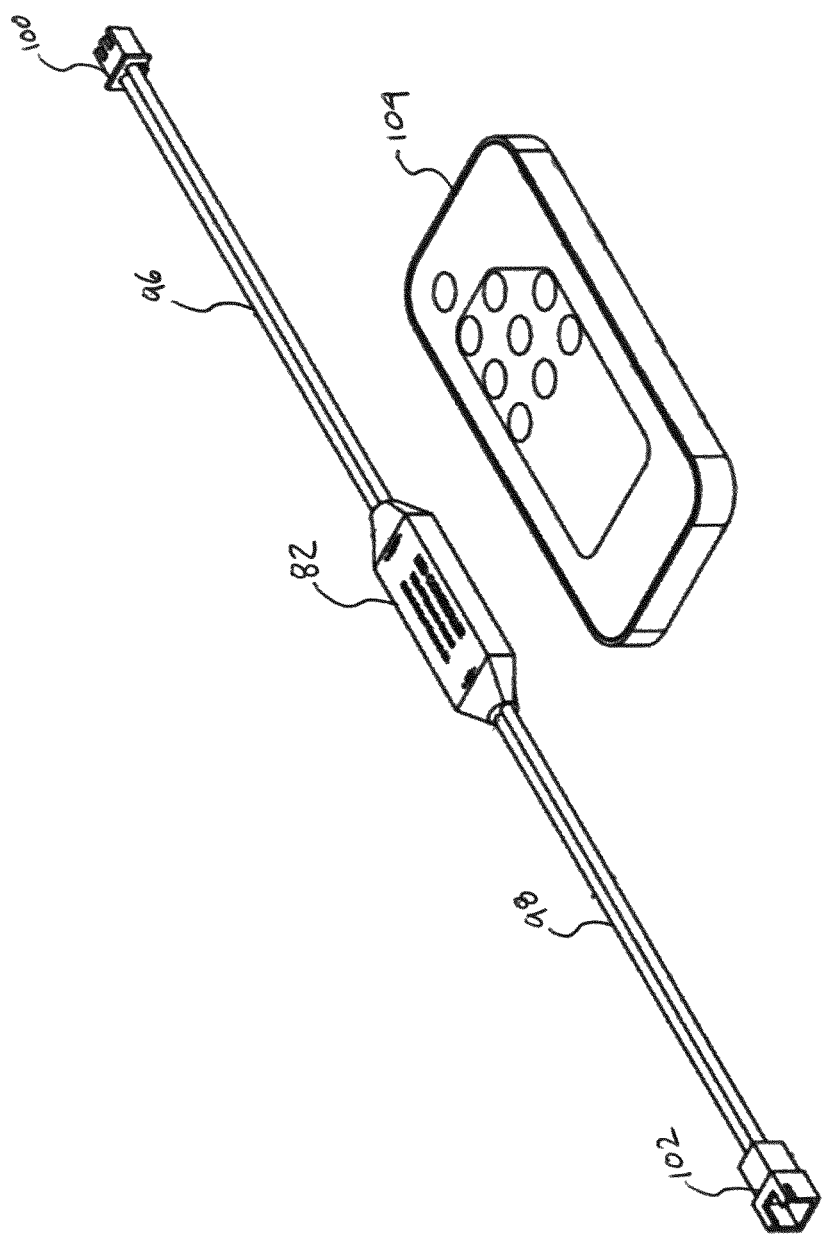
FIG. 6 is a perspective view of an LED controller assembly of the modular photograph display assembly of the present disclosure.

FIG. 6 is a perspective view of the LED controller 82 of the modular photograph display assembly 10, illustrating connections thereto. The LED controller 82 can include an input power conductor 96 and an output power/control cable 98. The input power conductor 96 can include a connector 100 (e.g., male-type or female-type) which can be removably coupled to the connector 94 of the LED driver 80 to provide power to the LED controller 82. The output power/control cable 98 can include a connector 102 (e.g., male-type or female-type) for removably coupling the LED controller 82 to one or more illumination panels 20. For example, the female-type connector 102 shown in FIG. 6 can be coupled to the male-type connector 32a of the illumination panel 20, thereby enabling control of the illumination panel 20 via the LED controller 82. According to some aspects of the present disclosure, the controller 82 can be provided with wireless communication systems (e.g., RF, Wi-Fi, Bluetooth, etc.) for receiving control commends from a wireless assembly. For example, as shown in FIG. 6, the modular photograph display assembly 10 of the present disclosure can be provided with a RF remote 104 for controlling operation of the illumination panel 20 via controller 82, which can be equipped with an RF receiver. Alternatively, control commands can be sent to the controller 82 from a user's mobile device (e.g., smartphone, tablet, laptop, etc.) via Wi-Fi communication protocols or via Bluetooth communication protocols.

Figure 7:
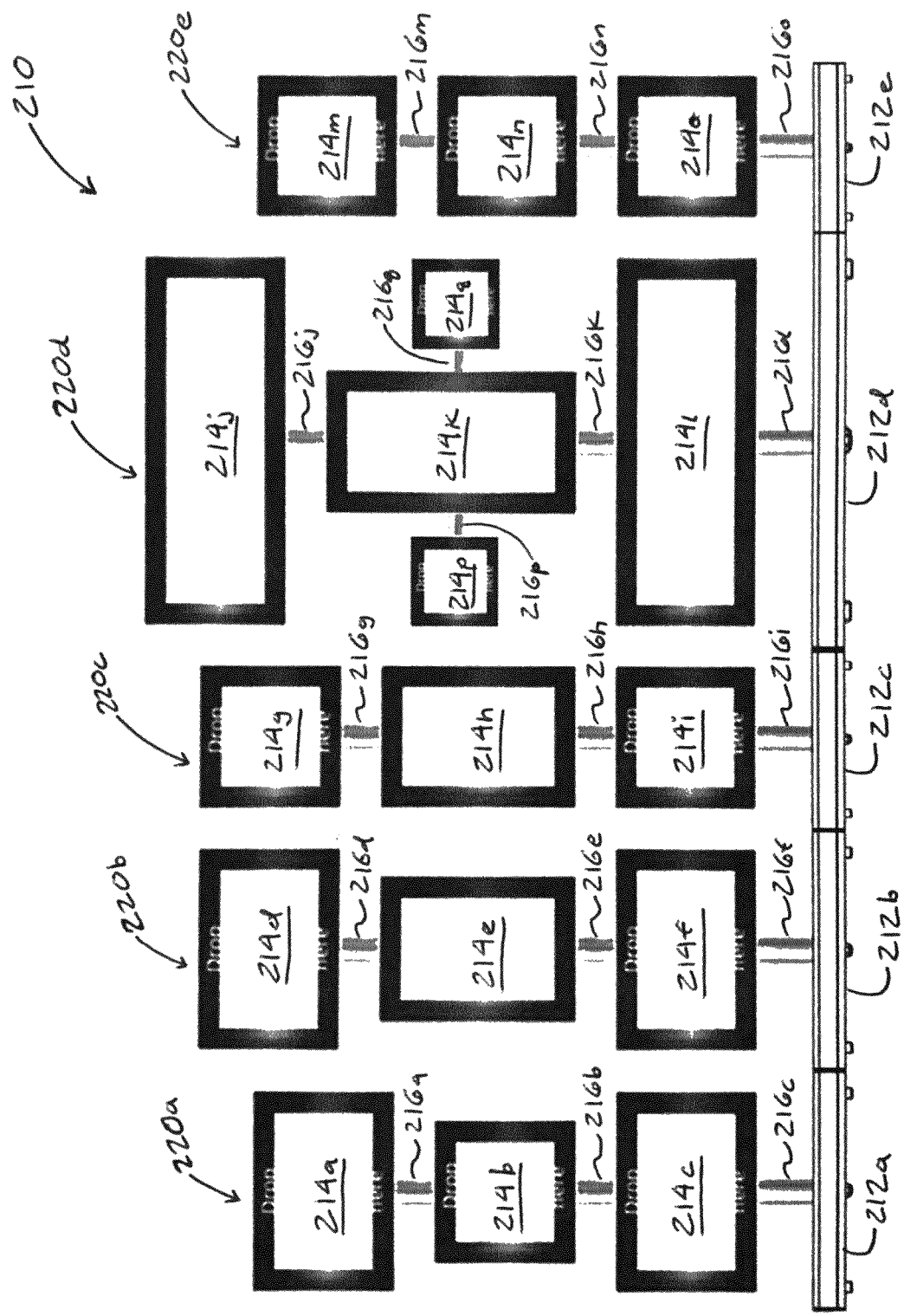
FIG. 7 is a front view of the modular photograph display system of the present disclosure, showing a plurality of modular photograph display assemblies.

FIG. 7 is a front view of the modular photograph display assembly of the present disclosure, indicated generally at 210, wherein a plurality of bases 212a-e (together, bases 212), a plurality of frames 214a-q (together, frames 214), and a plurality of posts 216a-q (together, posts 216) are combined to form an array of display assemblies. Each of the bases 212, frames 214, and posts 216 can be substantially similar in form and/or function to the base 12, frame 14, and post 16 described in connection with FIGS. 1-4, except for distinctions noted herein. As shown in FIG. 7, a plurality of frames 214 and posts 216 can be arranged in a column on a single base 212 and a plurality of bases 212 can be coupled together to form the modular photograph display assembly 210 of the present disclosure. For example, frames 214a-c and posts 216a-c can be arranged on base 212a in a first column, indicated generally at 220a, frames 214d-f and posts 216d-f can be arranged on base 212b in a second column, indicated generally at 220b, frames 214g-i and posts 216g-i can be arranged on base 212c in a third column, indicated generally at 220c, frames 214j-1 and posts 216j-1 can be arranged on base 212d in a fourth column, indicated generally at 220d, and frames 214m-o and posts 216m-o can be arranged on base 212e in a fifth column, indicated generally at 220e. Additionally, an LED driver and/or control unit can be positioned in each of the bases 212 for powering the illumination panels of the frames 214 (e.g., by daisy-chaining) thereabove. Alternatively, a single LED driver and/or control unit can be disposed in one of the bases 212 for powering the illumination panels of the frames 214 in a plurality of columns and/or rows. According to some aspects of the present disclosure, one or more frames 214 can also be coupled to, and extend from, the sides of other frames 214. For example, as shown in FIG. 7, an additional frame 214q can be coupled to a right side of frame 214k by way of an additional post 216q extending horizontally therefrom and a second additional frame 214p can be coupled to a left side of frame 214k by way of second additional post 216p extending horizontally therefrom. The additional horizontally arranged posts 216p and 216q and frames 214p and 214q can be coupled to the vertically arranged posts 216 and frames 214 shown in FIG. 7 using the connections described herein (e.g., the posts being coupled about apertures in the sidewalls of the frame back plates and the illumination panels being daisy-chained together).

As shown in FIG. 7, the frames 214 can be provided in a plurality of sizes, shapes, and orientations, and configured to accept photographs of various sizes (e.g., 4"×4", 4"×6", 4"×8", 4"×12", 6"×6", 6"×9", 6"×12", 6"×18", and the like). As will be appreciated by those of ordinary skill in the art, the assembly 210 is but a single exemplary configuration and a plurality of custom configurations are possible by varying the number of frames 214 in each column, varying the orientation of the frames 214 in each column, and/or varying the number of columns 220. For example, with respect to FIG. 7, the assembly 210 can be reconfigured by removing the frame 214a from the first column 220a, changing the orientation of the frame 214 d (e.g., from a horizontal to a vertical orientation) in the second column, removing the frame 214m from the fifth column 220e and adding the frame 214m to the third column 220c, and the like. As shown in FIG. 7, when constructing, reconfiguring, and/or adding to the assembly 210 it can be beneficial to position the widest frame 214 in a column at the bottom thereof, in order to maintain stability and structural integrity. Moreover, the base 212 for a particular column 220 can be sized to accommodate the widest frame 214 thereabove. For example, a base 214 can have a width (e.g., 4", 6", 8", 9", 12", 18", etc.) that is greater than or equal to the width of the widest frame 214 in the column 220.

According to some aspects of the present disclosure, the posts 216 (and the posts 16) can be provided in a plurality of sizes in order to vary the vertical spacing between the frames 214 and/or the bases 212. For example, as shown in FIG. 7, the posts 216 can have a height of 2", such that the assembly 210 can be suitably sized for placement on a table, desk, shelf, or the like. Alternatively, posts 216c, 216f, 216l, and 216o can have a height of 36" or more, such that the assembly 210 can be suitably sized for placement on a floor and function as a freestanding floor unit. Additional variations in the sizing of the posts 216 are possible and can be selected based on the environment in which the assembly 210 can be placed.

Figure 8:
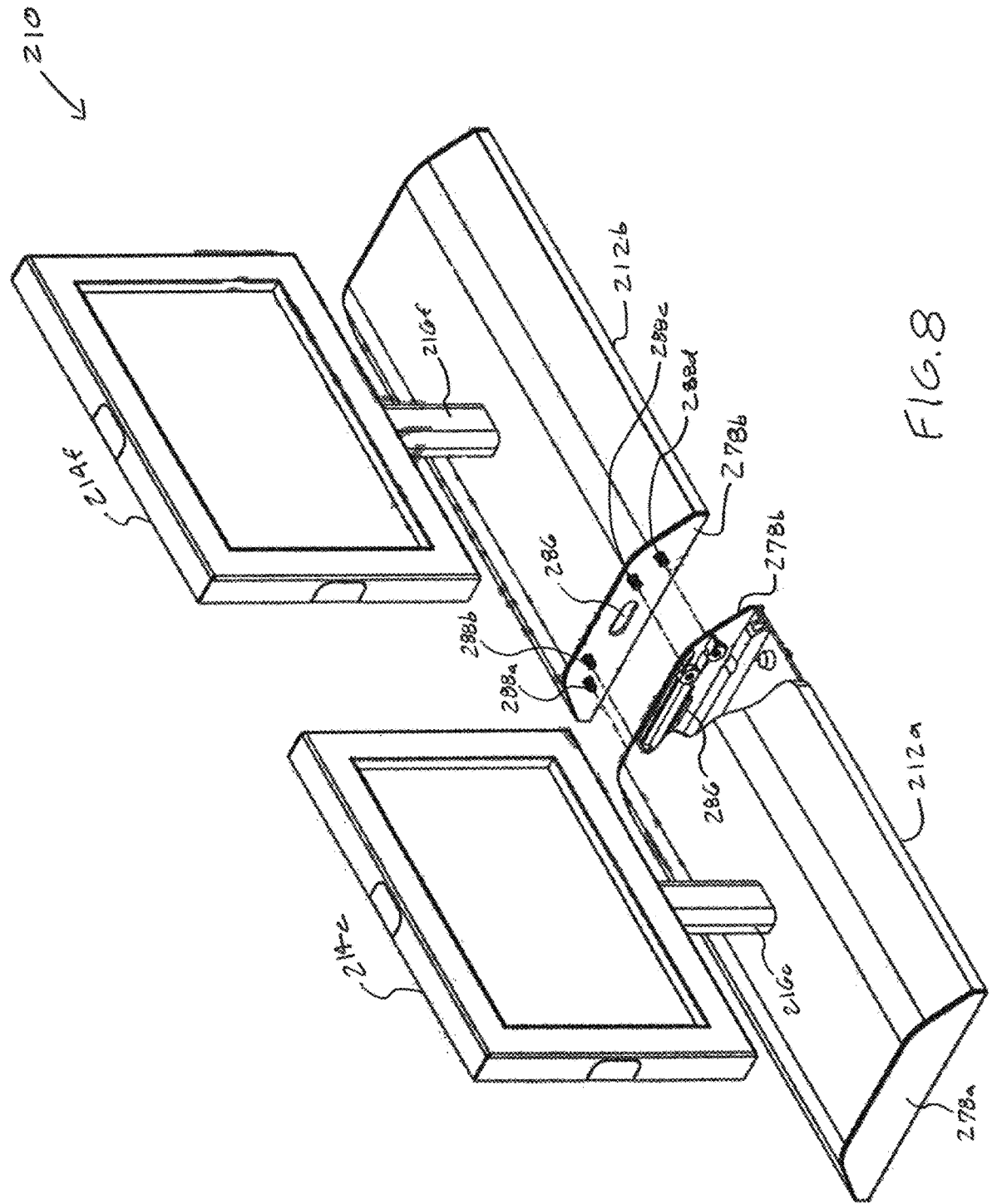
FIG. 8 is an exploded view illustrating connections between the modular photograph display assemblies of FIG. 7.

FIG. 8 is an exploded view illustrating connections between components of the modular photograph display assembly 210 shown in FIG. 7. During assembly of the assembly 210, the base 212a, with frame 214c and post 216c thereon, can be coupled to the base 212b, with frame 214f and post 216f thereon. Each of the bases 212 can include one or more of sidewalls 278a and 278b. As shown, sidewalls 278a can include a continuous surface and can be suitable for an exterior end of the assembly 210 and sidewalls 278b can include an aperture 286 therethrough and one or more fastening mechanisms 288a-d (e.g., nuts and bolts, screws, clips, etc.) for removably securing sidewalls 278b together. The apertures 286 can be positioned such that when adjacent bases 212a and 212b are secured together by fasteners 288a-d, the apertures 286 are aligned and can form a passage between interior spaces of the bases 212a and 212b. As such, electrical connections can be made therebetween. For example, a power and/or control cable can extend from an LED driver and/or controller within base 212a, through apertures 286 in sidewalls 278b, and into base 212b for connection to an illumination panel positioned within frame 214f. Accordingly, one or more illumination panels within one or more frames 214 can be couple to and/or controlled by an LED driver and/or controller in a base of an adjacent column.

Figure 9:
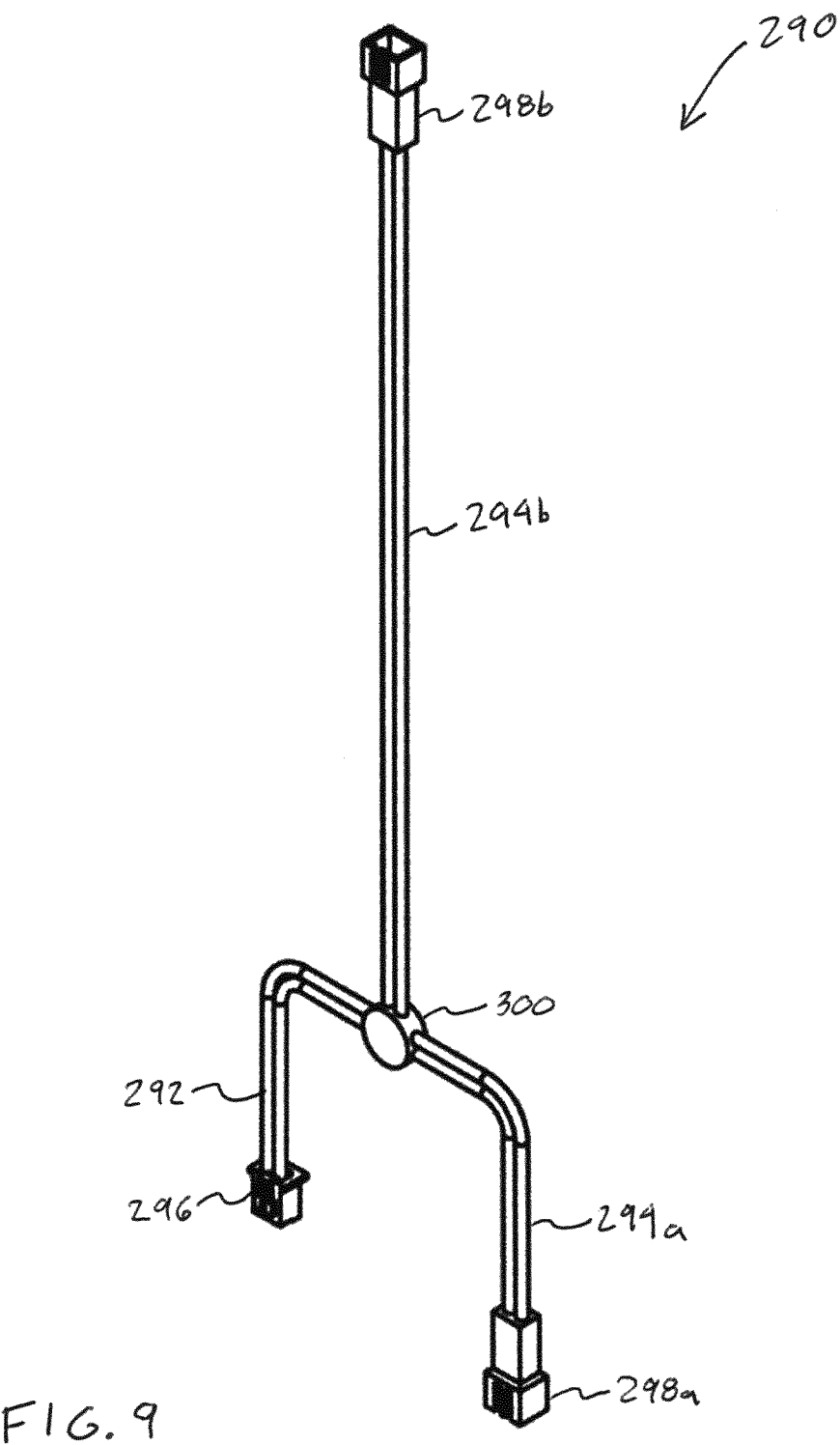
FIG. 9 is a perspective view of a wiring harness of the modular photograph display system of the present disclosure.

FIG. 9 is a perspective view of a wiring harness 290 of the modular photograph display assembly 210 of the present disclosure. As shown, the wiring harness 290 can include an input power/control cable 292 with a male-type connector 296, a first output power/control cable 294a with a female-type connector 298a, and a second output power/control cable 294b with a female-type connector 298b. Power/control cables 292, 294a, and 294b can be coupled together by way of a junction 300. Additionally, output power/control cable 294b can be longer than output power/control cable 294a for connection to a component (e.g., illumination panel, controller, etc.) in an adjacent column 220, as described below. The wiring harness 290 can provide power and/or control signals to a plurality of illumination panels in a plurality of different frames 214. For example, with respect to FIG. 7, the input power/control cable 292 can be electrically coupled to an LED driver and/or controller positioned within base 212a, output control/power cable 294a can be electrically coupled to an illumination panel within frame 214c (which can in turn be coupled with illumination panels in frames 214b and 214a via daisy-chaining), and output control/power cable 294b can be electrically coupled to an illumination panel within frame 214f (which can in turn be coupled with illumination panels in frames 214e and 214d via daisy-chaining). Furthermore, two or more of the wiring harnesses 290 can be connected to power and/or control components in additional columns 210.

Figure 10:
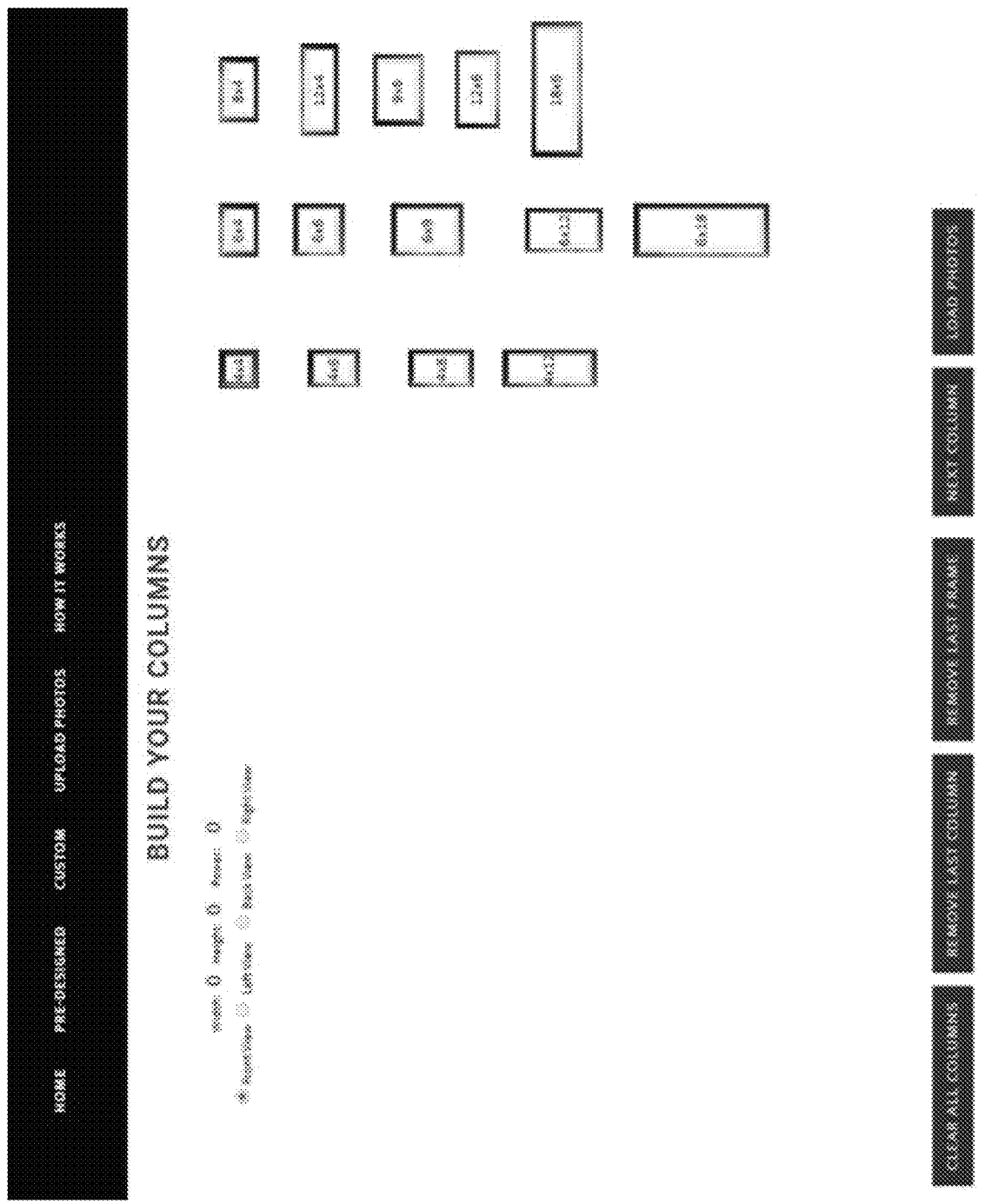
FIG. 10 is a first graphic user interface generated by a computer based design application of the present disclosure.
Figure 11:
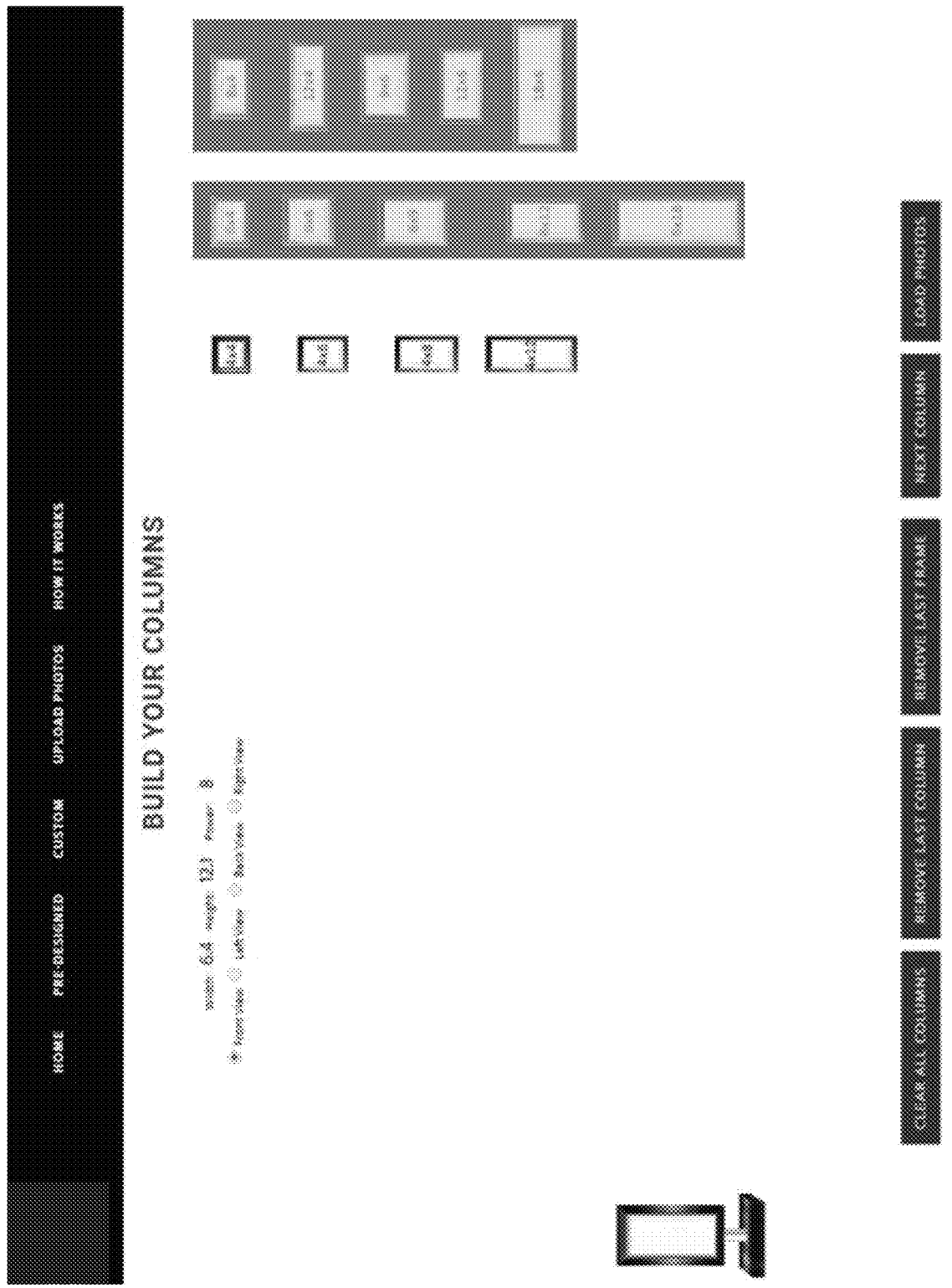
FIG. 11 illustrates a first configuration of a modular photograph display system within the graphic user interface of FIG. 10.
Figure 12:
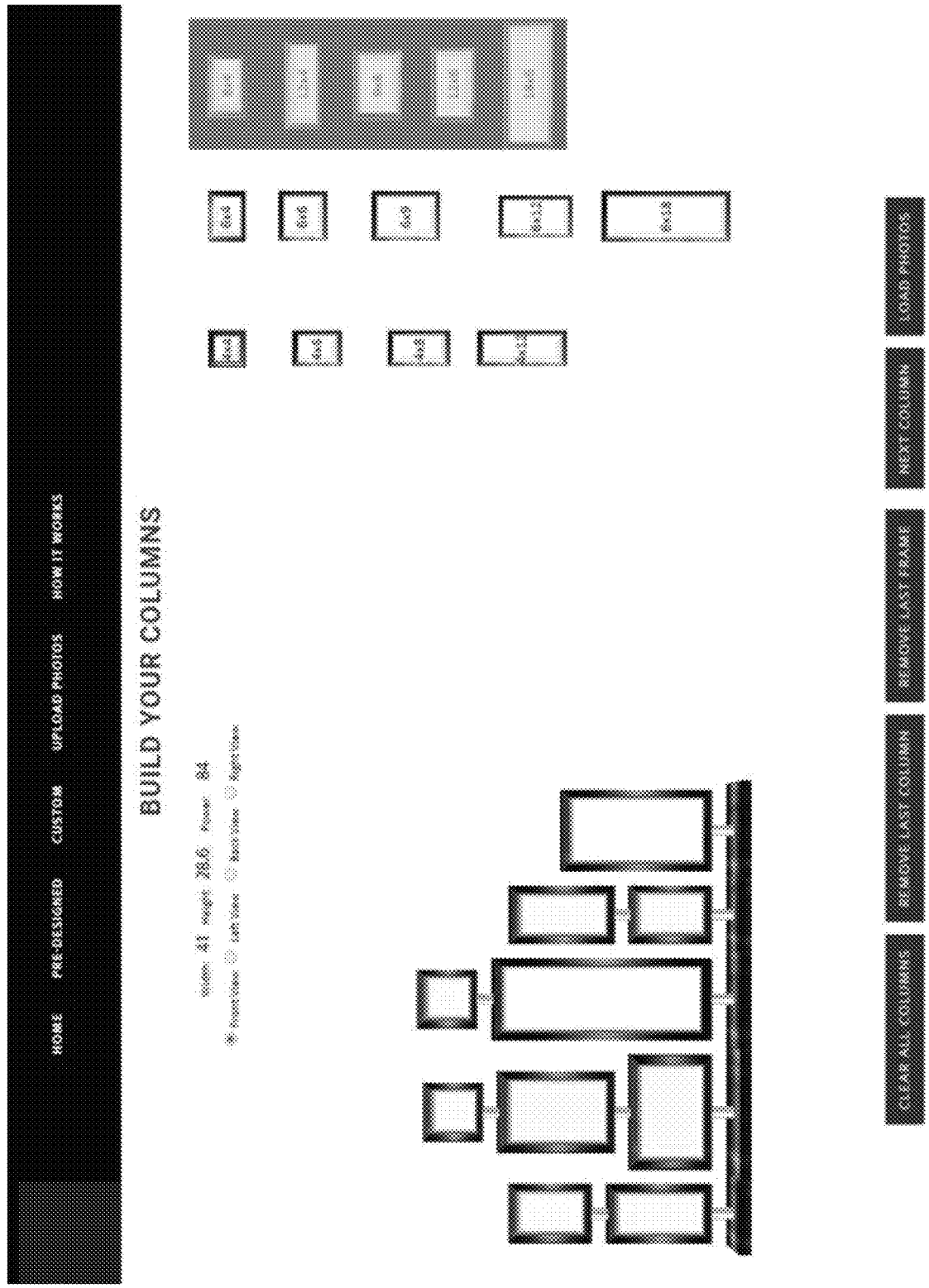
FIG. 12 illustrates a second configuration of the modular photograph display system within the graphic user interface of FIG. 10.
Figure 13:
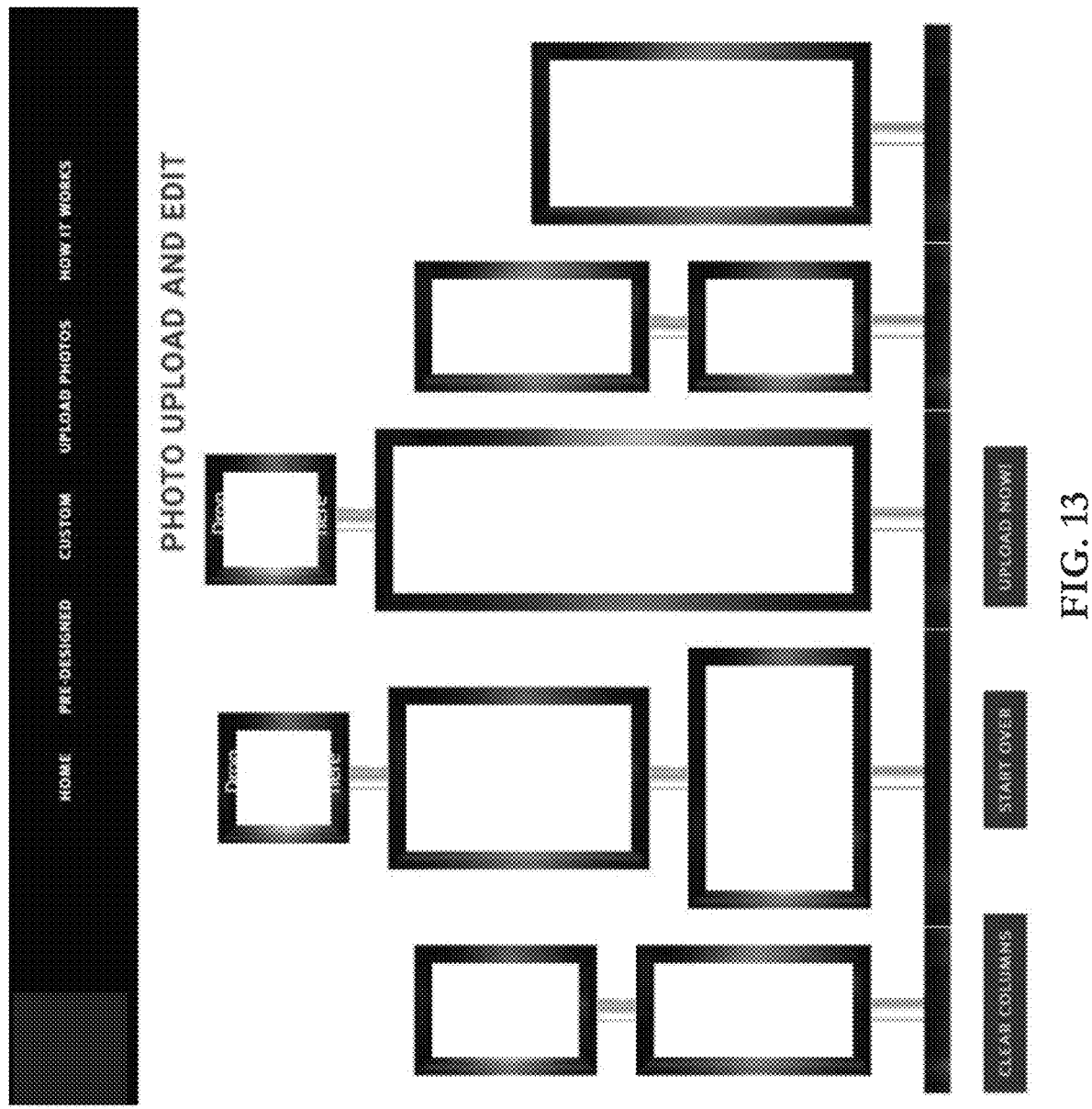
FIG. 13 is a second graphic user interface generated by the design application of the present disclosure.

According to some aspects of the present disclosure, the modular photograph display system can be designed using a computer based software design application that could be accessed via a website or executed on a local computer system. FIGS. 10-13 illustrate exemplary graphic user interfaces that can be generated by the computer based software design application of the present disclosure. More specifically, FIG. 10 is a first graphic user interface generated by the design application of the present disclosure, FIG. 11 illustrates a first configuration of a modular photograph display system within the graphic user interface of FIG. 10, FIG. 12 illustrates a second configuration of the modular photograph display system within the graphic user interface of FIG. 10, and FIG. 13 is a second graphic user interface generated by the design application of the present disclosure Such an application can provide the user with a one or more preconfigured display system layouts or present the user with an option to configure a custom display system layout. For example, the system can present the user with a plurality of available photograph/frame sizes and the user can select one or more frames that can be placed in a first column of the display system. Once the user has made a first frame selection (e.g., the frame adjacent to the base and at the bottom of a column), the system can determine an appropriate size for the base (e.g., having a width generally equal to the first frame selection) and can display frames that can be placed on top of the first frame (e.g., frames having widths less than or equal to the first frame). The system can also can prevent the user from selecting frames that cannot be placed on top of the first frame (e.g., frames having widths greater than the first frame) by hiding said frames from the user. After the user has made one or more frame selections for the first column, the system can generate a graphical user interface element (e.g., a button) that allows the user to move to the next column. The user can then repeat the foregoing steps until the user is satisfied with the design and a custom modular display system with one or more columns and/or rows has been completed. As the user is designing the custom display system, the configuration system can generate a three dimensional or two dimensional model, including one or more views, of the design. Once the user has completed the design, the configuration system can prompt the user to upload one or more digital images to system and can position the uploaded images in the one or more frames of the custom photograph display system. Once the photographs have been uploaded to the configuration system and all selections have been confirmed by the user, the configuration system can then fabricate the display system, as specified by the user, print the photographs uploaded by the user, and place said photographs in the appropriate frames. The complete custom display system can then be assembled and shipped to the user.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A modular photograph display system, comprising:
at least one modular photograph display assembly, comprising:
a frame including a frame back with sidewalls having one or more apertures therein, an illumination panel secured to the frame back, a window, one or more magnetic clip assemblies, and a cover, the one or more magnetic clip assemblies securing the window against the illumination panel such that a first photograph can be secured therebetween and illuminated by the illumination panel, and the one or more magnetic clip assemblies magnetically securing the cover to the frame back;
a base having a top panel with an aperture therein, a base plate, and sidewalls, the top panel, base plate, and sidewalls enclosing a circuit for providing power to the illumination panel;
a hollow post positioned between the frame and base, a first end of the hollow post coupled to the frame about a first of the one or more apertures in the sidewalls thereof and a second end of the hollow post coupled about the aperture in the top panel of the base; and
a power conductor electrically coupled to the illumination panel and the circuit, the power conductor extending through the one or more apertures in the sidewalls of the frame back, the hollow post, and the aperture in the top panel of the base.

2. The modular photograph display system of claim 1, wherein the illumination panel is a backlight and is illuminated by one or more of non-organic light-emitting diode illumination, organic light-emitting diode illumination, incandescent illumination, fluorescent illumination, and electroluminescent illumination.

3. The modular photograph display system of claim 1, wherein an orientation of the frame relative to the base is variable by uncoupling the hollow post from the frame and coupling the hollow post to a second of the apertures in the frame back.

4. The modular photograph display system of claim 1, wherein the cover includes one or more cutouts in sidewalls thereof shaped to receive the hollow post and positioned to correspond with the one or more apertures in the sidewalls of the frame back.

5. The modular photograph display system of claim 4, comprising one or more aperture covers shaped to correspond with the one or more cutouts in the cover of the frame, the one or more aperture covers being in snap-fit engagement with the one or more apertures in the sidewalls of the frame back.

6. The modular photograph display system of claim 1, wherein the one or more clip assemblies each include a clip body with a finger extending therefrom, a magnet positioned within the clip body, and a fastener extending through the magnet and the clip body, the fastener securing the clip assembly to the frame back.

7. The modular photograph display system of claim 6, wherein each of the one or more clip assemblies is rotatably positionable in a first position where the finger extends over the window and thereby secures the window to the frame back and a second position where the finger does not extend over the window and thereby releases the window from the fame back.

8. The modular photograph display system of claim 6, wherein the magnet includes a recess to receive a head of the fastener, such that the fastener does not extend beyond a top surface of the magnet.

9. The modular photograph display system of claim 8, wherein the clip body and magnet are sized such that the top surface of the magnet contacts the cover of the frame, thereby magnetically securing the cover to the frame back.

10. The modular photograph display system of claim 1, comprising a second power conductor electrically coupled to the illumination panel for providing power to a second illumination panel.

11. The modular photograph display system of claim 10, comprising a second hollow post, a first end of the second hollow post coupled to the frame back about a second of the one or more apertures opposite the first of the one or more apertures.

12. The modular photograph display system of claim 11, comprising a second frame back, a second end of the second hollow post coupled to an aperture in a sidewall of the second frame back.

13. The modular photograph display system of claim 12, wherein the second illumination panel is secured to the second frame back and one or more second clip assemblies secure a second window against the second illumination panel such that a second photograph can be secured therebetween and illuminated by the second illumination panel, the one or more second clip assemblies magnetically securing a second cover to the second frame back.

14. The modular photograph display system of claim 13, wherein the second frame back, the second illumination panel, the second window, and the second cover are configured to accept the second photograph, the second photograph being a different size than the first photograph.

15. The modular photograph display system of claim 1, comprising:
a second modular photograph display assembly, comprising:
a second frame including a second frame back with sidewalls having one or more apertures therein, a second illumination panel secured to the second frame back, a second window, one or more second magnetic clip assemblies, and a second cover, the one or more second magnetic clip assemblies securing the second window against the second illumination panel such that a second photograph can be secured therebetween and illuminated by the second illumination panel, and the one or more second magnetic clip assemblies magnetically securing the second cover to the second frame back;
a second base having a second top panel with an aperture therein, a second
a second hollow post positioned between the second frame and second base, a first end of the second hollow post coupled to the second frame about a first of the one or more apertures in the sidewalls thereof and a second end of the second hollow post coupled about the aperture in the second top panel of the second base; and a second power conductor electrically coupled to the illumination panel, the second power conductor extending through the one or more apertures in the sidewalls of the second frame back, the second hollow post, and the aperture in the second top panel of the second base.

16. The modular photograph display system of claim 15, wherein at least one of the sidewalls of the base includes an aperture therethrough and at least one of the sidewalls of the second base includes a second aperture therethrough, the first and second apertures forming a passage between interiors of the base and the second base.

17. The modular photograph display system of claim 16, wherein the second illumination panel is electrically coupled to the circuit enclosed in the base by way of a wiring harness extending from the base, through the passage between the interiors of the base and into the second base.

18. The modular photograph display system of claim 17, wherein the wiring harness is electrically coupled to an output of the circuit, the illumination panel, and the second illumination panel.

19. The modular photograph display system of claim 1, wherein the circuit for providing power to the illumination panel is an LED driver and the illumination panel is an LED backlight.

20. The modular photograph display system of claim 19, comprising an LED controller enclosed in the base and configured to modify one or more of intensity, temperature, and color of the LED backlight.

\* \* \* \* \*